United States Patent
Honjo et al.

(10) Patent No.: US 8,560,746 B2
(45) Date of Patent: Oct. 15, 2013

(54) ACCESS CONTROL APPARATUS, ACCESS CONTROL METHOD AND STORAGE SYSTEM

(75) Inventors: Nobuyuki Honjo, Kawasaki (JP); Atsuhiro Otaka, Kawasaki (JP); Atsushi Katano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 203 days.

(21) Appl. No.: 13/173,663

(22) Filed: Jun. 30, 2011

(65) Prior Publication Data

US 2012/0005384 A1 Jan. 5, 2012

(30) Foreign Application Priority Data

Jul. 2, 2010 (JP) ................................. 2010-152147

(51) Int. Cl.
  *G06F 13/36* (2006.01)
  *G06F 13/00* (2006.01)

(52) U.S. Cl.
  USPC ............................. 710/116; 710/41; 711/158

(58) Field of Classification Search
  USPC ..................... 710/36–41, 107–116, 316–317; 711/158
  See application file for complete search history.

(56) References Cited

U.S. PATENT DOCUMENTS

| | | | |
|---|---|---|---|
| 6,256,698 B1 * | 7/2001 | Zou | 710/113 |
| 6,941,428 B2 * | 9/2005 | Carr | 711/158 |
| 7,584,319 B1 * | 9/2009 | Liao et al. | 710/317 |
| 8,095,722 B1 * | 1/2012 | Liao et al. | 710/317 |
| 2004/0059881 A1 * | 3/2004 | Carr | 711/158 |
| 2005/0102479 A1 | 5/2005 | Innan et al. | |
| 2007/0220204 A1 | 9/2007 | Nakajima et al. | |

FOREIGN PATENT DOCUMENTS

| | | |
|---|---|---|
| JP | 2004-110367 | 4/2004 |
| JP | 2007-256993 | 10/2007 |

* cited by examiner

*Primary Examiner* — Christopher Shin
(74) *Attorney, Agent, or Firm* — Staas & Halsey LLP (57) ABSTRACT

An access control apparatus which establishes a connection based on connection establishment requests from connected devices and controls accesses to a connection target device. The access control apparatus includes a connection information managing unit which manages connect wait conditions to the connection target device of the connected devices based on criterion information in a connection request transmitted from the connected devices and determination for selecting one connected device from the connected devices. The access control apparatus includes a selecting unit which selects one of the connected devices which has a delay tendency related to connection based on adjustment information which is set in accordance with the connect wait conditions of the connected devices and increases a delay tendency in connection of the connected device, and a determining unit which determines the connected device selected by the selecting unit as one to be connected to the connection target device.

9 Claims, 10 Drawing Sheets

| Phy ID | 0 | 1 | 2 | ... | 7 | 8 |
|---|---|---|---|---|---|---|
| ATTACHMENT DEVICE | disk03-a | disk03-b | disk03-c | ... | exp02 | exp04 |
| AVERAGE AWT[$\mu$s] | 5 | 10 | 15 | ... | 5 | 50 |
| MINIMUM AWT[$\mu$s] | 0 | 5 | 10 | ... | 0 | 30 |
| MAXIMUM AWT[$\mu$s] | 15 | 20 | 25 | ... | 10 | 70 |
| FRAME | 5 | 5 | 5 | ... | 20 | 2 |
| ADDITION AWT[$\mu$s] | - | - | - | ... | - | - |

| Phy ID | 0 | 1 | 2 | ... | 7 | 8 |
|---|---|---|---|---|---|---|
| ATTACHMENT DEVICE | disk03-a | disk03-b | disk03-c | ... | exp02 | exp04 |
| AVERAGE AWT[$\mu$s] | 5 | 10 | 15 | ... | 5 | 50 |
| MINIMUM AWT[$\mu$s] | 0 | 5 | 10 | ... | 0 | 30 |
| MAXIMUM AWT[$\mu$s] | 15 | 20 | 25 | ... | 10 | 70 |
| FRAME | 5 | 5 | 5 | ... | 20 | 2 |
| ADDITION AWT[$\mu$s] | - | - | - | ... | - | 50 |

FIG. 7

| Phy ID | 0 | 1 | 2 | ... | 7 | 8 |
|---|---|---|---|---|---|---|
| ATTACHMENT DEVICE | disk03-a | disk03-b | disk03-c | ... | exp02 | exp04 |
| AVERAGE AWT[$\mu$s] | 5 | 10 | 15 | ... | 5 | 33 |
| MINIMUM AWT[$\mu$s] | 0 | 5 | 10 | ... | 0 | 0 |
| MAXIMUM AWT[$\mu$s] | 15 | 20 | 25 | ... | 10 | 70 |
| FRAME | 5 | 5 | 5 | ... | 20 | 3 |
| ADDITION AWT[$\mu$s] | - | - | - | ... | - | 50 |

ACCESS CONTROL APPARATUS, ACCESS CONTROL METHOD AND STORAGE SYSTEM

CROSS-REFERENCE TO RELATED APPLICATIONS

This application is based upon and claims the benefit of priority of the prior Japanese Patent Application No. 2010-152147, filed on Jul. 2, 2010, the entire contents of which are incorporated herein by reference.

FIELD

Embodiments discussed herein relate to access control apparatuses, access control methods and storage systems.

BACKGROUND

SAS (Serial Attached SCSI) has been known as one of data transfer methods between a host computer and a peripheral apparatus. According to SAS, devices connected under the SAS standard (hereinafter called a "SAS device") are concatenated through one or a plurality of bus connection adjusting units (hereinafter, called expanders) which are responsible for adjustment of bus connection.

When an access conflict occurs between SAS devices, an expander selects an SAS device having the longest AWT (Arbitration Wait Time) with priority under the SAS protocol for access leveling.

The AWT refers to a waiting time from the time when an SAS device issues a bus connection request (OAF: OPEN Address Frame) to the time when the bus connection is established.

When expanders are provided in a hierarchical structure, the OAFs selected by a lower expander are aggregated to a higher expander. The higher expander selects the OAF having the longest AWT with priority.

However, OAFs do not reach the higher expander at a predetermined time. If OAFs reach at different times, an OAF having a longer AWT than the AWT of the OAF selected by the expander may reach the expander later. Even in this case, the expander may not be able to select the OAF having reached later, and the AWT of the OAF having reached later may possibly further increase.

Thus, the OAF having a longer AWT finally times out, preventing the establishment of the bus connection.

Having described a system applying the SAS standard, the similar problems may occur in systems applying other standards for control over priority in and leveling of access processing.

SUMMARY

According to an aspect of an embodiment, an access control apparatus which establishes a connection based on connection establishment requests from a plurality of connected devices and controls accesses to a connection target device includes, a connection information managing unit which manages connect wait conditions to the connection target device of the connected devices based on criterion information in a connection request transmitted from the connected devices and determination for selecting one connected device from the plurality of connected devices. The access control apparatus includes a selecting unit which selects one of the connected devices which has a delay tendency related to connection based on adjustment information which is set in accordance with the connect wait conditions of the connected devices and increases a delay tendency in connection of the connected device, and a determining unit which determines the connected device selected by the selecting unit as one to be connected to the connection target device.

Objects and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures. Hereinafter, embodiments will be described in detail with reference to drawings.

An access control apparatus according to an embodiment will be described first, and the embodiment will then be described more specifically.

Figure 1:
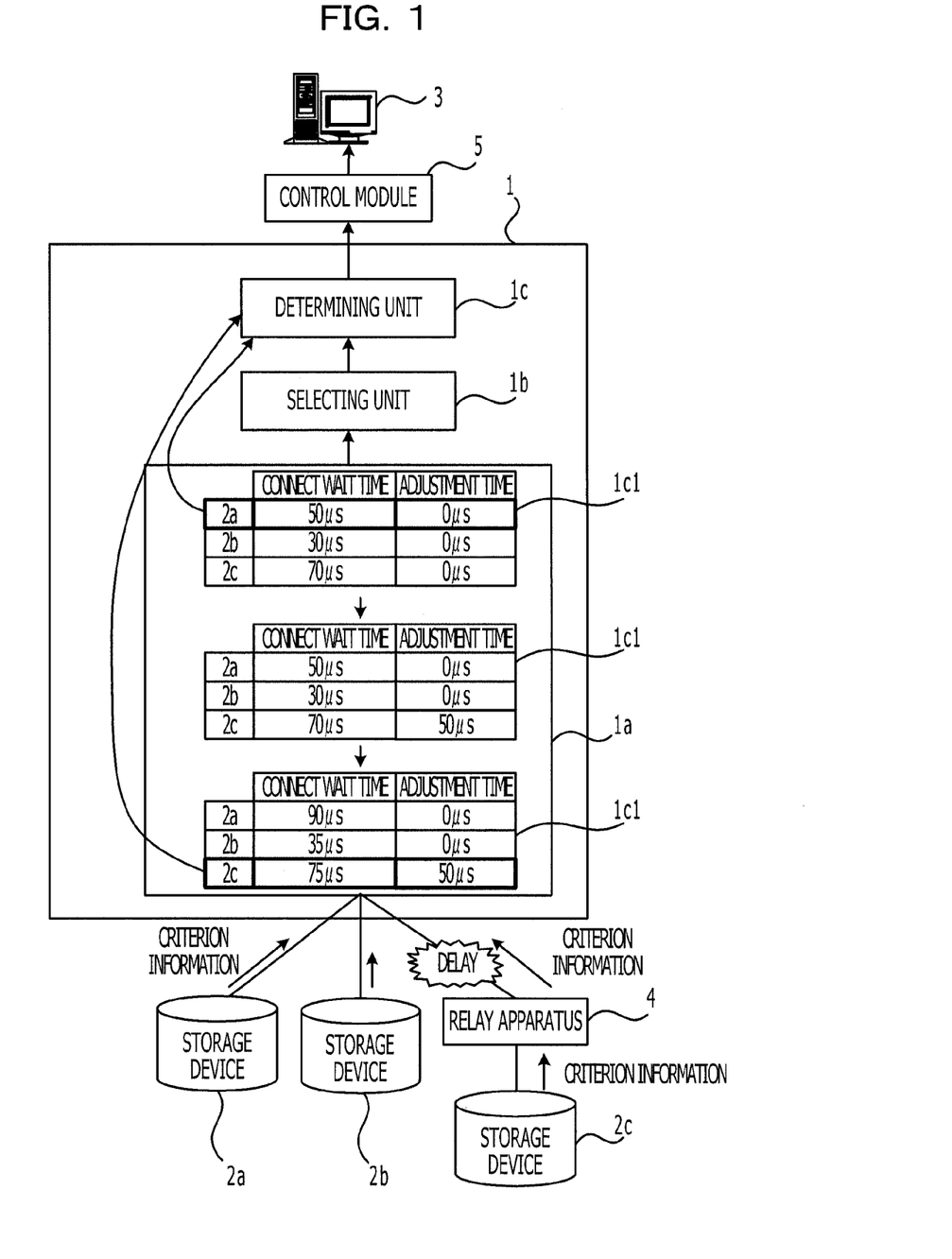
FIG. 1 schematically illustrates an access control apparatus according to an embodiment.

FIG. 1 schematically illustrates an access control apparatus according to an embodiment.

An access control apparatus 1 according to an embodiment includes a connection information managing unit 1a, a selecting unit 1b and a determining unit 1c.

The connection information managing unit 1a receives criterion information transmitted by a plurality of storage devices (connected devices) 2a, 2b, and 2c connected to the access control apparatus 1 in requesting bus connections to a control module 5 which establishes the connections with a connection target computer 3. On the basis of the received criterion information, the connection information managing unit 1a manages the connect wait conditions to the connection target computer 3 of the storage devices 2a, 2b, and 2c.

The criterion information refers to, for example, reference information for selecting one storage device from the storage devices 2a, 2b, and 2c. For example, according to the SAS standard, an AWT is the criterion information, for example. While particular examples of criterion information is described herein, the present invention is not limited to any particular criteria for selecting a device for connection to a target device.

Referring to FIG. 1, the storage devices 2a and 2b are directly connected to the connection information managing unit 1a. The storage device 2c is connected to the connection information managing unit 1a through a relay apparatus (connected apparatus) 4. The relay apparatus 4 may be an apparatus having a similar function to that of the access control apparatus 1, for example.

The information describing the connect wait condition may be the time (connect wait time) from the output of a bus connection request by the storage device 2a, 2b, or 2c to the establishment of the bus connection. The connect wait time may be the difference between the time of the output of a bus connection request contained in output criterion information and the current time, for example.

FIG. 1 illustrates a table 1c1 which manages connect wait times, for example. The table illustrates that the connect wait time of the storage device 2a, which is set on the basis of the value in an OAF, for example, is equal to 50 µs, the connect wait time of the storage device 2b is equal to 30 µs, and the connect wait time of the storage device 2c is equal to 70 µs.

The selecting unit 1b selects one storage device having a delay tendency relative to bus connection on the basis of the connect wait conditions of the storage devices 2a, 2b, and 2c and adjustment information for increasing a delay tendency of the bus connections of the storage devices 2a, 2b, and 2c.

Whether a storage device has a delay tendency or not may be determined if, for example, the connect wait time exceeds a predetermined threshold value. It is assumed in the following description that the connect wait time (70 µs) of the storage device 2c exceeds the threshold value.

The adjustment information may be a predetermined time (adjustment time), for example. Alternatively, the adjustment information may be a sign for identifying the priority in bus connection.

In FIG. 1, predetermined "50 µs", for example, i is set in the field for the adjustment time in the table 1c1 for the storage device 2c having the value exceeding the threshold value.

The connection information managing unit 1a sets (or resets) the connect wait time to 0 µs if the selecting unit 1b selects one storage device from the storage devices 2a, 2b, and 2c.

The selecting unit 1b selects one connected device having a delay tendency related to bus connection on the basis of the connect wait time and adjustment time.

The determining unit 1c determines the storage device selected by the selecting unit 1b as one to be connected to the connection target computer 3. The determining unit 1c notifies the control module 5 of the fact that the storage device selected by the selecting unit 1b as one to be connected to the connection target computer 3.

The control module 5 implements bus connection to the storage device determined by the determining unit 1c. Thus, under the control of the control module 5, the connection is established between the storage device determined by the determining unit 1c and the connection target computer 3.

Next, operations by the access control apparatus 1 is described in detail below.

The connection information managing unit 1a defines a reception time, which is a predetermined period of time, for criterion information and calculates the connect wait time on the basis of the criterion information received within the reception time. The selecting unit 1b selects a storage device having the longest connect wait time.

If the table 1c1 does not have an adjustment time set, the selecting unit 1b selects one connected device having a delay tendency related to bus connection only on the basis of the connect wait time.

Comparing between the connect wait times in the upper table 1c1 in FIG. 1, the storage device 2c having the longest connect wait time should be selected. However, it is assumed here that a delay has occurred in transmission of criterion information from the relay apparatus 4 to the access control apparatus 1, and the arrival of the criterion information is late for the reception time. In this case, the storage device 2a is selected which has the longest connect wait time calculated on the basis of the criterion information received within the reception time.

Because the connect wait time (70 µs) of the storage device 2c which has been late for the reception time exceeds the threshold value, the selecting unit 1b sets predetermined "50 µs" to the adjustment time field in the table 1c1 for the storage device 2c having the higher value than the threshold value, as in the second table 1c1 from the top.

The connection information managing unit 1a then sets all connect wait times in the table 1c1 to 0 µs.

The determining unit 1c determines the storage device 2a selected by the selecting unit 1b as the one to be connected to the connection target computer 3. The determining unit 1c then notifies the control module 5 of the fact that the storage device 2a has been determined as the one to be connected to the connection target computer 3. The control module 5 implements bus connection from the storage device determined by the determining unit 1c. Under the control of the control module 5, the connection is established between the storage device 2a determined by the determining unit 1c and the connection target computer 3.

The connection information managing unit 1a re-defines a reception time, which is a predetermined period of time, for criterion information and calculates the connect wait time on the basis of the criterion information received within the reception time.

The lowest table 1c1 in FIG. 1 illustrates connect wait times calculated on the basis of the re-defined reception time.

If the table 1c1 has an adjustment time set, the selecting unit 1b calculates the sum of the connect wait time and the adjustment time and thus selects one connected device having a delay tendency related to a bus connection.

Comparing only between the connect wait times of the storage devices 2a to 2c (2a, 2b and 2c) in the lowest table 1c1 in FIG. 1, the storage device 2a has the longest connect wait time "90 µs". However, adding the connect wait times and the adjustment time, the storage device 2c has the longest connect wait time "125 (50+75) µs". Therefore, the selecting unit 1b selects the storage device 2c.

The determining unit 1c determines the storage device 2c selected by the selecting unit 1b as the one to be connected to the connection target computer 3. The connection is established between the determined storage device 2c and the connection target computer 3.

In the access control apparatus 1, the connection information managing unit 1a sets an adjustment time for a bus connection request taking a time to some extent for establishing the bus connection. The selecting unit 1b then selects one storage device on the basis of the connect wait time and adjustment time. This allows leveling of bus connections and prevention of delays in establishment of bus connections.

According to an embodiment, the selecting unit 1b calculates the sum of the connect wait time and the adjustment times to select one connected device having a delay tendency in bus connection. However, without limiting thereto, one connected device having a delay tendency in bus connection may be selected only on the basis of the adjustment time.

The connection information managing unit 1a, selecting unit 1b, and determining unit 1c may be implemented by functions that a CPU (central processing unit) in the access control apparatus 1 has. The table 1c1 may be implemented by a data storage area in a RAM (random access memory), an HDD (hard disk drive) or the like that the access control apparatus 1 has.

Hereinafter, a more specific embodiment will be described in which the disclosed access control apparatus is applied to a storage system.

Figure 2:
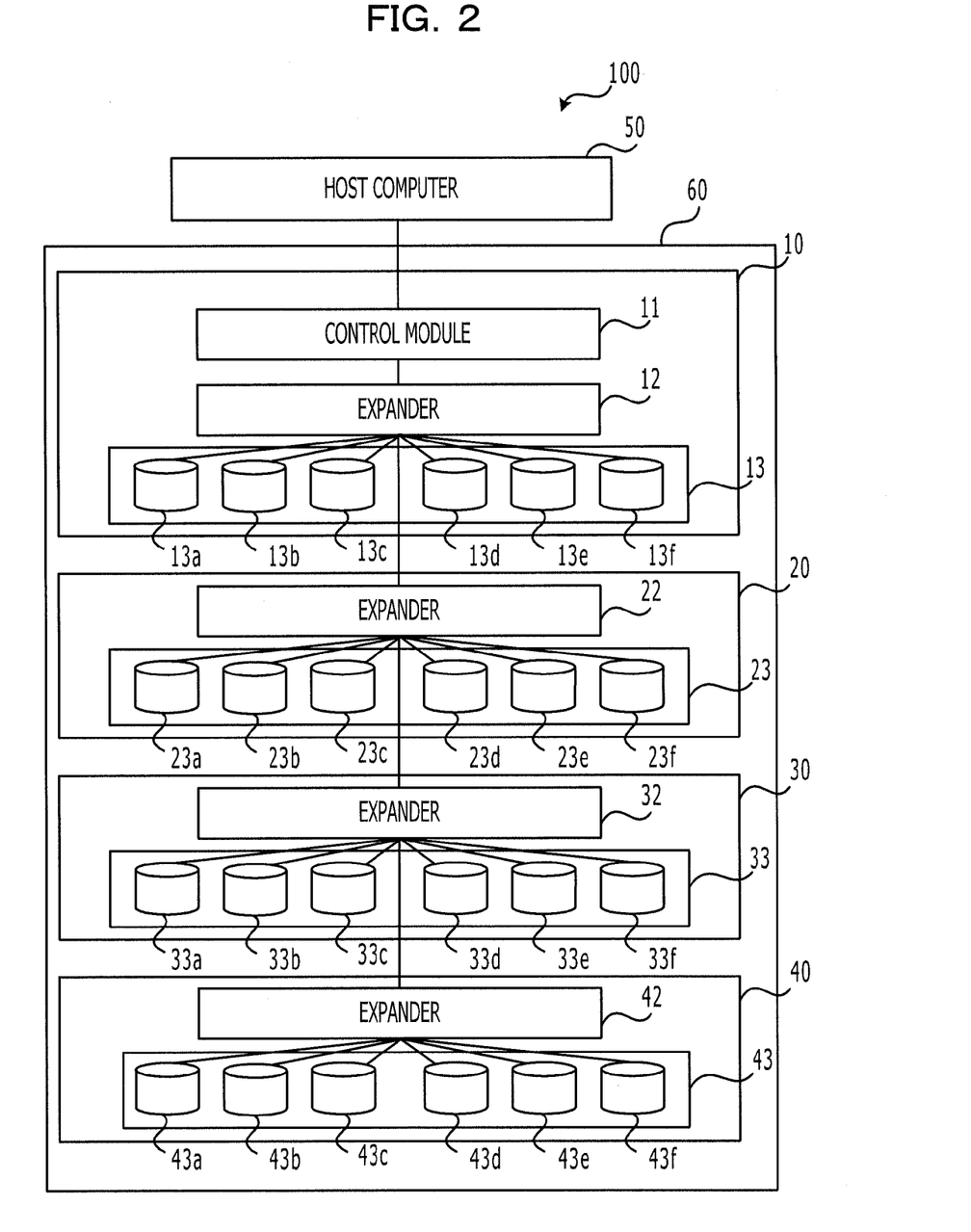
FIG. 2 is a block diagram illustrating a storage system according to an embodiment.

FIG. 2 is a block diagram illustrating a storage system according to an embodiment.

A storage system 100 includes a host computer (connection target computer) 50 and a device enclosure 60 to be connected to the host computer 50.

The device enclosure 60 has control blocks 10, 20, 30, and 40.

The control block 10 has a control module 11, an expander (access control apparatus) 12, and a drive enclosure (DE) 13.

The control block 20 has an expander 22 and a drive enclosure 23. The control block 30 has an expander 32 and a drive enclosure 33. The control block 40 has an expander 42 and a drive enclosure 43.

The control blocks 10, 20, 30, and 40 are units provided here for convenience of description.

Each of the drive enclosures 13, 23, 33, and 43 has six disks which are serially connected to the expanders 12, 22, 32, and 42 under the SAS standard (hereinafter, simply called SAS connect"). For example, the drive enclosure 13 has disks 13a, 13b, 13c, 13d, 13e, and 13f having the SAS connected to the expander 12. The type of the disks may be an HDD (hard disk drive), an SSD (solid state drive) or the like, for example.

Hereinafter, each of the disks that the drive enclosures 13, 23, 33, and 43 have will be called "the disk" if without distinction.

The drive enclosures 13, 23, 33, and 43 have a RAID configuration in consideration of redundancy.

The disk periodically issues an OAF, which has been described above, in order to request a bus connection to the control module 11. The disk re-issues an OAF if the bus connection has not been established with the first issued OAF. The AWTs of the second and later issued OAFs are AWTs to which the AWT contained in the last issued OAF is added. For example, the AWT of the third issued OAF is an AWT to which the AWTs contained in the first and second issued OAFs are added.

The control module 11 is SAS connected to the host computer 50 and expander 12. Illustrating one host computer 50 in FIG. 2, a plurality of host computers may be connected to the control module 11.

On the basis of instructions by the host computer 50, the control module 11 controls data writing to the drive enclosures 13, 23, 33, and 43 with which the bus connections have been established and data reading from the drive enclosures 13, 23, 33, and 43 through the expanders 12, 22, 32, and 42.

The expanders 12, 22, 32, and 42 have a hierarchical structure and are SAS connected to the control module 11. More specifically, the expander 12 is the highest expander and is directly connected to the control module 11. The expander 22, expander 32, and expander 42 sequentially have lower levels, and the expander 42 is the lowest expander.

The expanders 12, 22, 32, and 42 have an AWT management table (which will be described below) which manages information on AWTs.

Each of the expanders 12, 22, 32, and 42 selects an OAF to be connected with priority in accordance with the AWTs output by the disks.

More specifically, the expanders 12, 22, 32, and 42 receive OAFs from disks connected to the expanders for a predetermined period of time (reception time). After a lapse of the reception time, the OAF having the longest AWT is selected.

The expanders 12, 22, 32, and 42 issue the selected OAF to the higher expander. (The expander 12 directly connected to the control module 11 issues the OAF to the control module 11).

In selecting the OAF, the expanders 12, 22, 32, and 42 refer to the AWT management table and thus detect a disk not having bus connection established to the control module 11 for a predetermined or longer period of time. The expanders 12, 22, 32, and 42 implement control for increasing the possibility that the detected disk can have bus connection established to the control module 11. The control method will be described in detail below.

This hardware configuration can implement the processing functions of the control module 10.

Next, the operations by the storage system 100 will be described briefly.

The control module 11 transmits an I/O command as access instruction information to the drive enclosures 13, 23, 33, and 43 for data input/output instruction to a storage area of a disk that the drive enclosures 13, 23, 33, and 43 have. If no response is acquired even after a lapse of an access monitor time from the input/output instruction, the control module 11 transmits an abort instruction command for aborting the I/O processing to the drive enclosures 13, 23, 33, and 43.

Hereinafter, the processing by the expanders 12, 22, 32, and 42 will be briefly described in a case where all disks provided in the device enclosure 60 issue OAFs to the control module 11 in accordance with access instruction information and an access conflict occurs as a result.

The expander 12 selects an OAF having the longest AWT among the OAFs issued by the disks 13a to 13f. The expander 12 then issues the selected OAF to the control module 11. Thus, the bus connection is established between the disk having issued the selected OAF and the control module 11, which allows data writing/reading to/from the host computer 50.

The expander 22 selects an OAF having the longest AWT among the OAFs issued by the disks 23a to 23f (23a, 23b, 23c, 23d, 23e, and 23f). The expander 22 issues the selected OAF to the higher expander 12.

The expander 32 selects an OAF having the longest AWT among the OAFs issued by the disks 33a to 33f (33a, 33b, 33c, 33d, 33e, and 33f). The expander 32 issues the selected OAF to the higher expander 22.

The expander 42 selects an OAF having the longest AWT among the OAFs issued by the disks 43a to 43f (43a, 43b, 43c, 43d, 43e, and 43f). The expander 42 issues the selected OAF to the higher expander 32.

If the bus connection is established between the selected OAF and the control module 11, an accept frame for the accept of the bus connection establishment arrives from the control module 11 through the corresponding expanders to the disk having issued the selected OAF.

On the other hand, a disk having issued an unselected OAF to the corresponding expander is prevented from establishing bus connection until the release of bus connection by the disk being in bus connection established. Thus, a disk having issued an OAF which has not been selected by the corresponding expander re-issues an OAF to which the wait time is added to the expander.

After that, when the bus connection to the control module 11 is released by the disk having been in bus connection, the expander 12 selects an OAF having the longest AWT from the OAFs from the disks excluding the disk having established the bus connection in an operation among the disk 13a to 13f and the OAF selected by the lower expander 22 and issues it to the control module 11.

The expander 22 selects an OAF having the longest AWT from the OAFs from the disks 23a to 23f and the OAF selected by the lower expander 32. The expander 22 then issues the selected OAF to the higher expander 12.

The expander 32 selects an OAF having the longest AWT from the OAFs from the disks 33a to 33f and the OAF selected by the lower expander 42. The expander 32 issues the selected OAF to the higher expander 22.

The expander 42 selects an OAF having the longest AVVT from the OAFs selected from the OAFs from the disks 43a to 43f. The selected OAF is issued to the higher expander 32.

As described above, the expanders 12, 22, 32, and 42 refer to the AWT management table and thus detect a disk not having bus connection established to the control module 11 for a predetermined or longer period of time. The expanders 12, 22, 32, and 42 implement control such that the AWT of the OAF of the detected disk can be the longest and thus increases the possibility that the OAF of the detected disk is selected with priority. The processing can increase the possibility that the detected disk can have bus connection to the control module 11.

Reference to the AWT management table is repeatedly performed, and the bus connections are sequentially established.

Figure 3:
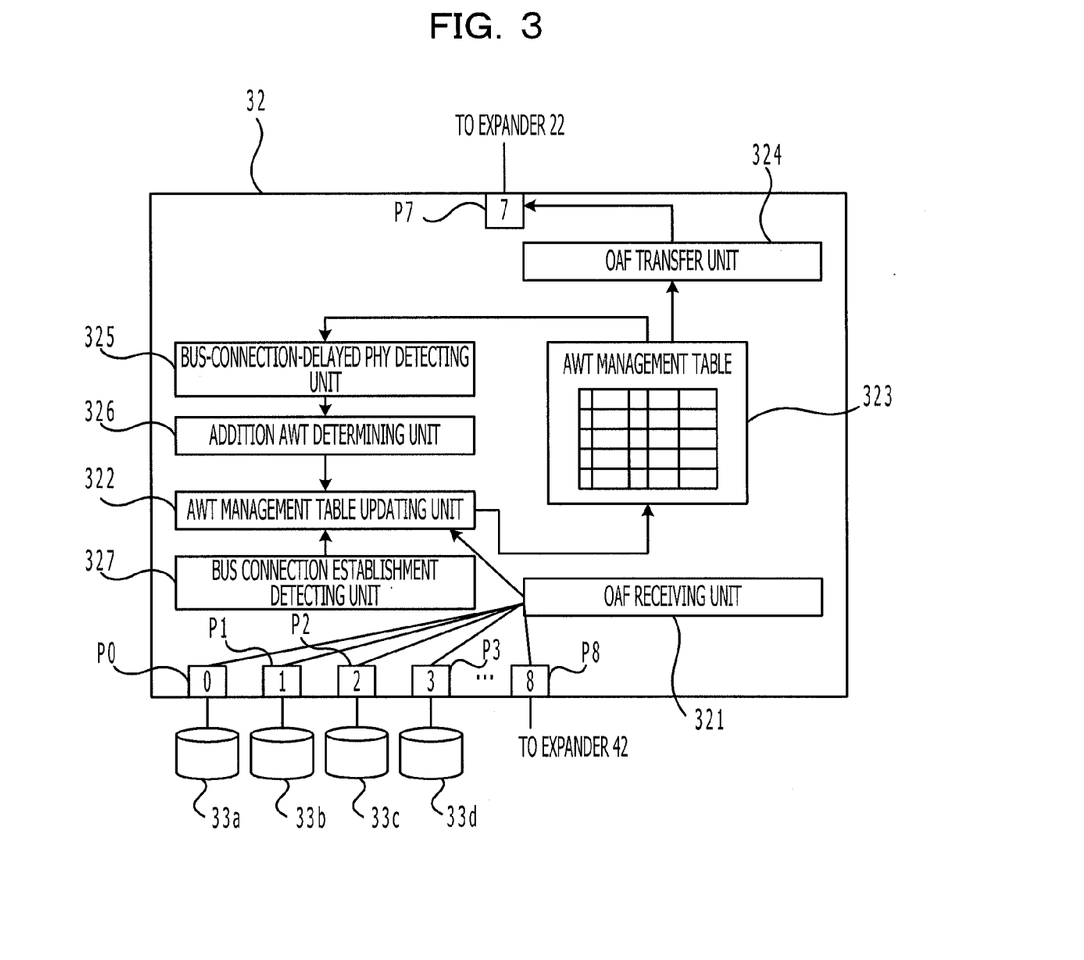
FIG. 3 is a block diagram illustrating function(s) of each expander.

Next, functions that each of the expanders has is described in detail below.

FIG. 3 is a block diagram illustrating functions of each expander. While FIG. 3 illustrates functions of the expander 32, the same is true in the functions of the expanders 12, 22, and 42.

The expander 32 includes an OAF receiving unit 321, an AWT management table updating unit 322, an AWT management table 323, an OAF transfer unit 324, bus-connection-delayed Phy detecting unit 325, an addition AWT determining unit 326, and a bus connection establishment detecting unit 327.

The OAF receiving unit 321 receives OAFs issued by the disks 33a to 33f through ports. The OAF receiving unit 321 receives the OAFs issued by the disks 43a to 43f through the expander 42 and a port.

The AWT management table updating unit 322 calculates the average value, minimum value, and maximum value of the AWTs contained in the OAFs received by the OAF receiving unit 321. The calculated average value, minimum value and maximum value are stored in the AWT management table 323.

If the AWT management table 323 receives an addition AWT from the addition AWT determining unit 326, the received addition AWT is stored to the AWT management table 323. The addition AWT is described below in detail.

The AWT management table updating unit 322 updates the AWT management table 323 from the AWT values in the OAFs having bus connection established, which are detected by the bus connection establishment detecting unit 327.

The AWT management table 323 may be a table stored in a RAM (random access memory) or ROM (read only memory) that the expander 32 has, for example.

The AWT management table 323 stores AWT information on bus connections of disks having been established up to the present point.

The OAF transfer unit 324 selects an OAF to be transferred to the expander 22 on the basis of AWTs stored in the AWT management table 323. More specifically, the OAF transfer unit 324 selects an OAF to be transferred to the expander 22 on the basis of AWTs contained in OAFs having received by the OAF receiving unit 321 and an addition AWT. The OAF transfer unit 324 then transfers the selected OAF to the expander 22.

The bus-connection-delayed Phy detecting unit 325 detects a disk having a delay tendency in bus connection from the AWT management table 323 for each Phy. The Phy is a port connected to a disk or an expander. According to an method for detecting a target Phy of AWT control, a Phy having a delay tendency in bus connection may be detected if the value of the average AVVT field in the AWT management table 323 is higher than a predetermined threshold value. According to another example method, if the standard deviation of the average time of the AWTs of all Phys that the expander 32 has is higher than a predetermined threshold value, the Phy having the longest average time of the AWT can be detected from all Phys as a Phy having a delay tendency in bus connection.

The addition AWT determining unit 326 determines a coefficient (addition AWT) indicating an AWT weight to be added to an OAF received through the Phy detected by the bus-connection-delayed Phy detecting unit 325. The method for setting the coefficient is described below in detail.

The bus connection establishment detecting unit 327 detects a bus connection if it receives an accept frame as described above.

Figure 4:
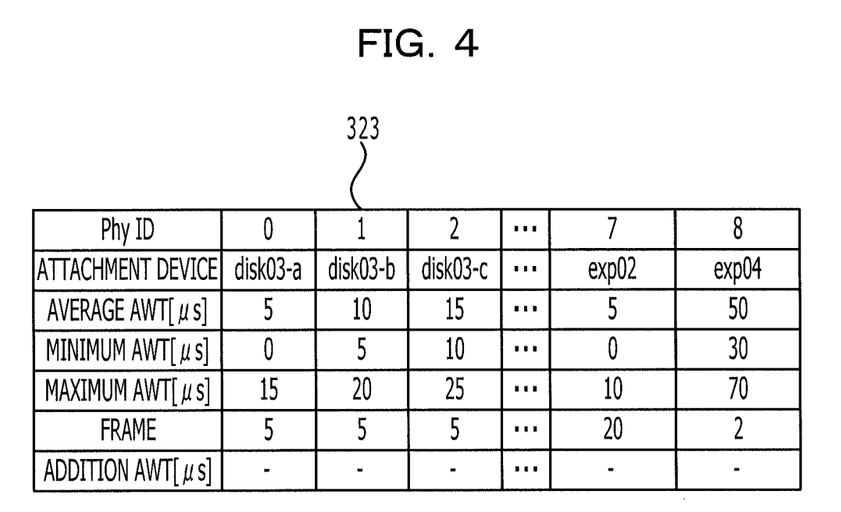
FIG. 4 illustrates information stored in an AWT management table.

Next, information stored in the AWT management table is described below in detail.

FIG. 4 illustrates information stored in an AWT management table.

The AVVT management table 323 illustrated in FIG. 4 is an AWT management table that the expander 32 has.

The field for a Phy ID stores a port number of a port that the expander 32 has. The identification number of an auxiliary device may be a port number of a port connected to one of the disks 33a to 33f, a port number of a port connected to the expanders 22 or 42, for example. Referring to FIG. 4, the fields store a port number "0" of a port P0 connected to the disk 33a, a port number "1" of a port P1 connected to the disk 33b, a port number "2" of a port P2 connected to the disk 33c, . . . , a port number "7" of a port P7 connected to the expander 22 and a port number "8" of a port P8 connected to the expander 42.

The field for an auxiliary device (Attachment Device) stores information for identifying a SAS device to which a port is to be connected. Referring to FIG. 4, for example, the fields store "disk03-a" indicating the disk 33a, "disk03-b" indicating the disk 33b, "disk03-c" indicating the disk 33, . . . , "exp02" indicating the expander 22, and "exp04" indicating the expander 42.

The field for the average AWT (Average AWT) stores an average value (µS) of AWTs of OAFs issued by a SAS device having bus connection established with the control module 11 up to the present point.

The field for a minimum AWT (Minimum AWT) stores a minimum value (µS) of AWTs of OAFs issued by a SAS device having bus connection established with the control module 11.

The field for a maximum AWT (Maximum AWT) stores a maximum value (µS) of AWTs of OAFs issued by a SAS device having bus connection established with the control module 11.

The field for a frame stores the number of OAFs issued by a SAS device having bus connection established with the control module 11 up to the present point.

The field for an addition AWT stores an addition AWT determined by the addition AWT determining unit 326.

Referring to the average AWT field in the AWT management table 323 illustrated in FIG. 4, the value of the average AWT of a Phy ID=8 (expander 42) is (about three to ten times) higher than values of the average AWTs of other Phy IDs. This allows the expander 32 to determine that the OAF from the expander 42 connected to the Phy ID=8 has a delay tendency in establishment of a bus connection.

Referring back to FIG. 3, the OAF transfer unit 324 selects with priority the OAF having the highest AWT set from a plurality of received OAFs. The OAF transfer unit 324 then transfers the selected OAF to the expander 22.

Because other disks having issued the unselected OAFs are not allowed the establishment of the bus connection until the release of the bus right by the device being in bus connection, they issue OAFs to which a wait time is further added to the expander 32 again.

Figure 5:
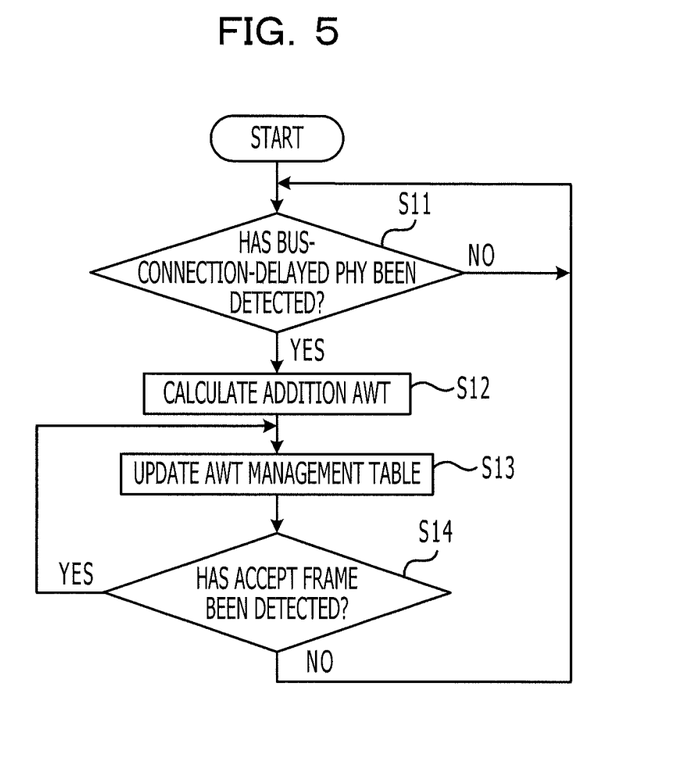
FIG. 5 is a flowchart illustrating an updating processing on an AVVT management table.

Next, updating processing on the AWT management table 323 by the expander 32 is described with reference to a flowchart.

FIG. 5 is a flowchart illustrating updating processing on an AWT management table.

[S11] The bus-connection-delayed Phy detecting unit 325 detects a Phy having a delay tendency in bus connection on the AWT management table 323. If the Phy is detected (Yes in S11), the processing moves to operation S12. If the Phy is not detected (No in S11), the processing awaits detection of the Phy.

[S12] The addition AWT determining unit 326 calculates the AWT value (addition AWT) to be added to the OAF received through the Phy detected by the bus-connection-delayed Phy detecting unit 325. After that, the processing moves to operation S13.

[S13] The AWT management table updating unit 322 sets the addition AVVT calculated by the addition AWT determining unit 326 to the addition AWT field in the AWT management table 323 to thus update the AWT management table. In operation S14, if the bus connection establishment detecting unit 327 detects the establishment of a bus connection, the AWT management table updating unit 322 updates the AWT management table on the basis of the AWT value of the OAF issued by the disk identified on the basis of the accept frame detected by the bus connection establishment detecting unit 327. The update method is described below. The processing then moves to S14.

[S14] The bus connection establishment detecting unit 327 determines whether the accept frame has been detected or not. If the accept frame has been detected (Yes in S14), it is determined that the bus connection has been established. The processing moves to S13. If the accept frame has not been detected (No in S14), it is determined that the establishment of the bus connection has not been detected or the bus connection has been released. The processing moves to S11.

The description on the processing in FIG. 5 ends here.

Figure 6:
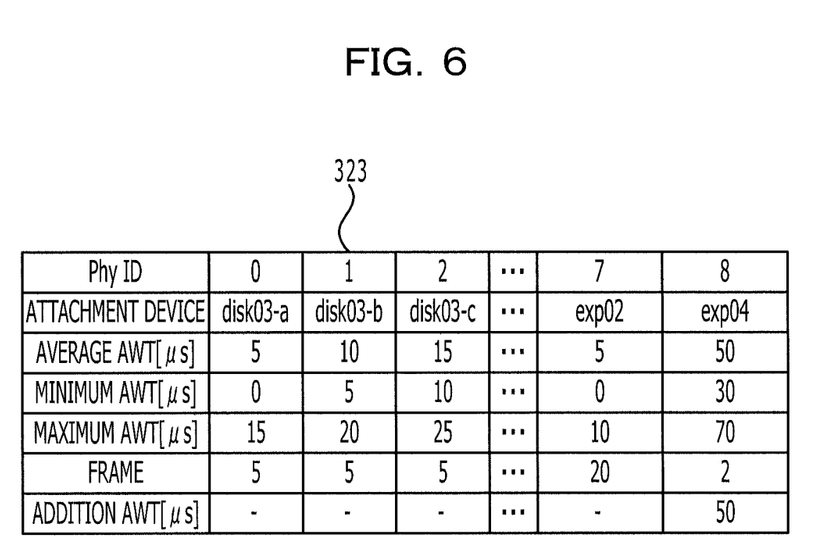
FIG. 6 illustrates processing results by an increased AWT calculating unit.
Figure 7:
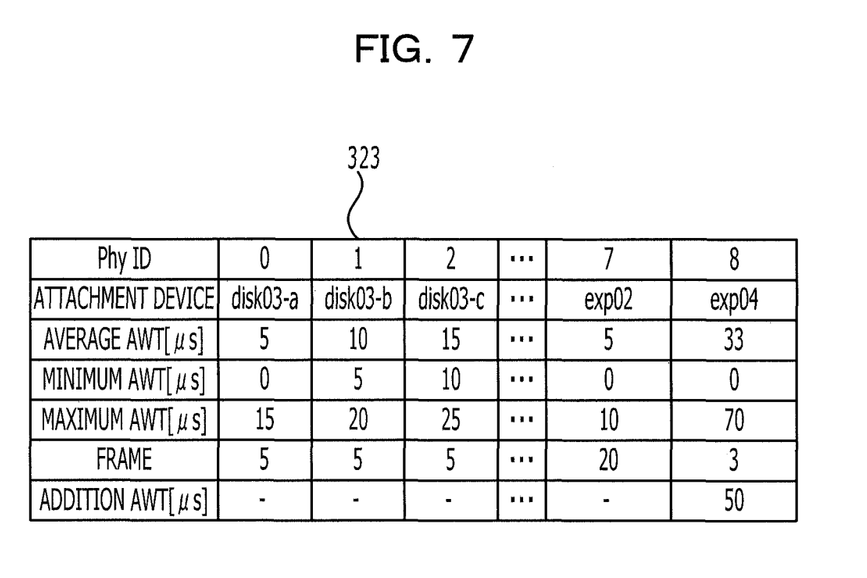
FIG. 7 illustrates an updated AWT management table.
Figure 8:
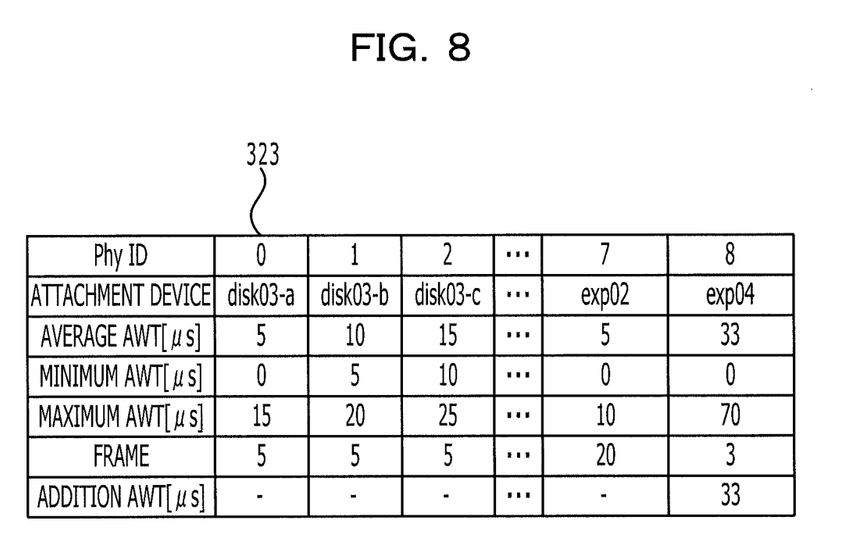
FIG. 8 illustrates an AWT management table as a result of re-execution of AWT control.

An example of the processing in FIG. 5 will be described below with reference to the AWT management table 323 illustrated in FIG. 6 to FIG. 8 (FIGS. 6, 7 and 8).

[Seq 1] According to the concrete example, the bus-connection-delayed Phy detecting unit 325 detects the Phy ID=8 having the value of the average AWT field in the AWT management table 323 that is higher than a predetermined threshold value as a Phy having a delay tendency in bus connection.

If an OAF from the expander 42 is not selected by the expander 32 in the present selection operation by the OAF transfer unit 324, the expander 42 issues again the OAF issued by a disk whose OAF has not been selected among the disks 43a to 43f to the expander 32. The addition AWT determining unit 326 in the expander 32 having received the OAF again determines to add the value "50 µs" in the average AWT field to the AWT in the OAF received from the expander 42. The AWT management table updating unit 322 then updates the AWT management table 323.

FIG. 6 illustrates processing results by an increased AWT calculating unit.

The AWT management table updating unit 322 sets the value "50" in the average AWT field for the Phy ID=8 in the AWT management table 323 as an addition AWT to the addition AWT field under the Phy ID=8. As the result, the addition AWT field in the AWT management table 323 stores "50".

The addition AWT may be calculated from the amount of alienation from the average AWTs in the fields for all Phys.

[Seq 2] When a plurality of devices including the expander 42 issue OAFs to the expander 32 for establishing bus connections, the OAF from the Phy ID=8, that is, the expander 42 having "50" stored in the addition AWT field has a higher possibility to have a longer AWT than those in the OAFs from the other Phys and a higher possibility to be selected as an OAF to be transferred to the higher expander 22.

In the next selection operation, the OAF transfer unit 324 selects an OAF having the highest AWT set from the OAFs received by the expander 32. Because 50 µs is added to the AWT of the OAF received from the expander 42, the OAF from the expander 42 has a higher possibility to have a longer AWT than those of the OAFs from the other Phys and has a higher possibility to be selected as an OAF to be transferred to the higher expander 22.

Until the selection of the OAF from the expander 42, 50 µs is added to the OAF from the expander 42 every issue of an OAF from the expander 42. This increases the possibility that the OAF from the expander 42 is selected as an OAF to be transferred to the expander 22.

When the OAF transfer unit 324 selects the OAF from the expander 42 as an OAF to be transferred to the higher expander 22, the OAF transfer unit 324 includes the AWT of the OAF received from the expander 42 to which the AWT "50" set in the addition AWT field is added in the selected OAF and transfers it to the expander 22.

[Seq 3] The expander 33 after establishment of the bus connection updates the AWT management table 323. More specifically, the bus connection establishment detecting unit 327 receives the corresponding accept frame from the control module 11 to thus detect the establishment of the corresponding bus connection. On the basis of the detection of the establishment of the bus connection by the bus connection establishment detecting unit 327, the AWT management table updating unit 322 updates the AWT management table 323.

In order to update the average AWT, minimum AWT and maximum AWT in the AWT management table, the AWT before weighted in the OAF having the bus connection established (i.e. original AWT) is used. For that reason, the addition AWT field is preferably provided separately from the average AWT, minimum AWT and maximum AWT fields. The separate field can save the processing of calculating the original AWT for updating the AWT management table 323 and can reduce the amount of computing.

FIG. 7 illustrates an updated AWT management table.

The updated AWT management table 323 stores "0" in the minimum AWT field under the Phy ID=8. This indicates that "50" stored in the addition AWT field allows an OAF from the expander 42 the establishment of the bus connection with an AWT=0. Because the bus connection has been established, the number of frames increments by one and increases from "2" to "3" in FIG. 6. The minimum AWT "0" leads the value "33 (100/3)" in the average AWT field which is reduced from "50 (100/2)" in FIG. 6.

Setting the addition AWT reduces the average AWT of the Phy ID=8 before the addition AWT is set, which improves the access leveling.

[Seq 4] After that, until further access leveling, the processing in Seq 1 and Seq 2 is repeated again for leveling AWTs upon establishment of bus connections, resulting in convergence of the standard deviations of all average AWTs within tolerance.

FIG. 8 illustrates an AWT management table as a result of re-execution of AWT control.

FIG. 8 illustrates the case where the Phy ID=8 having the higher value the average AWT field in the AWT management table 323 than a predetermined threshold value is detected again by the bus-connection-delayed Phy detecting unit 325 as a Phy having a delay tendency in bus connection.

The addition AWT determining unit 326 sets the value "33" of the average AWT under the Phy ID=8 having the highest AWT delay tendency as an AVVT weight for the Phy ID=8. As a result, the AWT management table 323 stores "33" in the addition AWT field.

As described above, the storage system 100 can prevent increases of the time (AWT) to the establishment of bus connections even from a disk mounted in a lower drive enclosure to the control module 11. This can prevent wrong determination of a disk without a physical failure as a failed disk due to I/O stagnation between a disk mounted in a lower drive enclosure and the host computer 50 or a delay of an OAF from a disk.

According to an embodiment, the configuration has been described in which a disk and the host computer 50 are connected through the control module 11. However, without limiting to the configuration, the control method of this embodiment is applicable to the configuration without the control module 11, that is, the configuration in which a housing containing an expander and a disk and a host computer are directly connected. This configuration applies the control method of this embodiment for establishment of bus connection between the host computer and a disk.

Next, a storage system according to an embodiment is described below in detail.

A storage system of an embodiment will be described mainly regarding differences from the above-identified embodiment, and the descriptions on similar points will be omitted.

Figure 9:
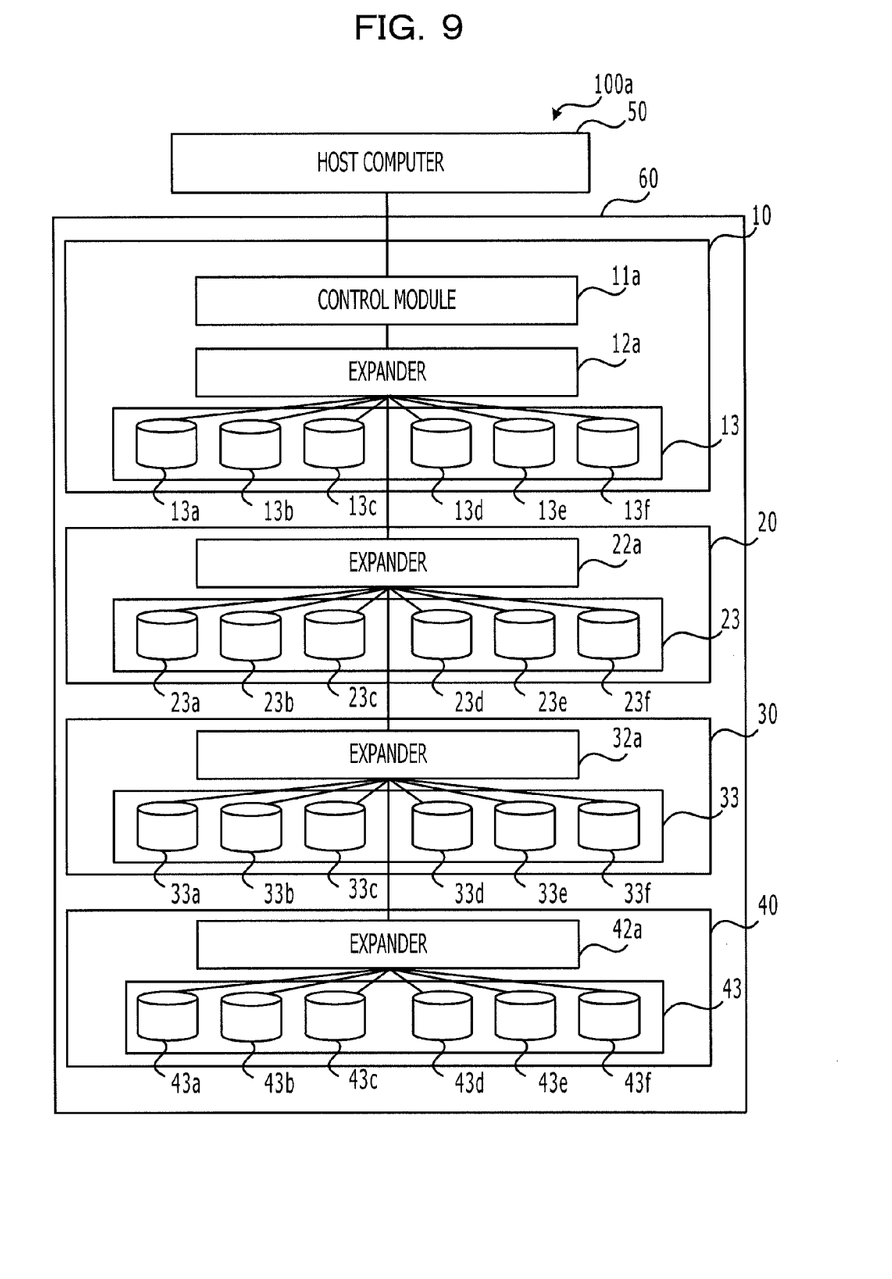
FIG. 9 illustrates a storage system according to an embodiment.

FIG. 9 illustrates a storage system according to an embodiment.

A storage system 100*a* according to an embodiment is different from the storage system 100 according to an embodiment in which the expanders 12, 22, 32, and 42 perform leveling processing under self-control. The difference is that a control module 11*a* itself selects a Phy having a delay tendency in establishment of a bus connection or a Phy on which bus connection processing is to be performed with priority though it does not have a delay tendency and instructs expanders 12*a*, 22*a*, 32*a*, and 42*a* to perform AWT control.

Each of the expanders 12*a*, 22*a*, 32*a*, and 42*a* provides a command causing the control module 11*a* to acquire an AWT management table that it has and a command to set an addition AWT to the AWT management table to the control module 11*a*.

Figure 10:
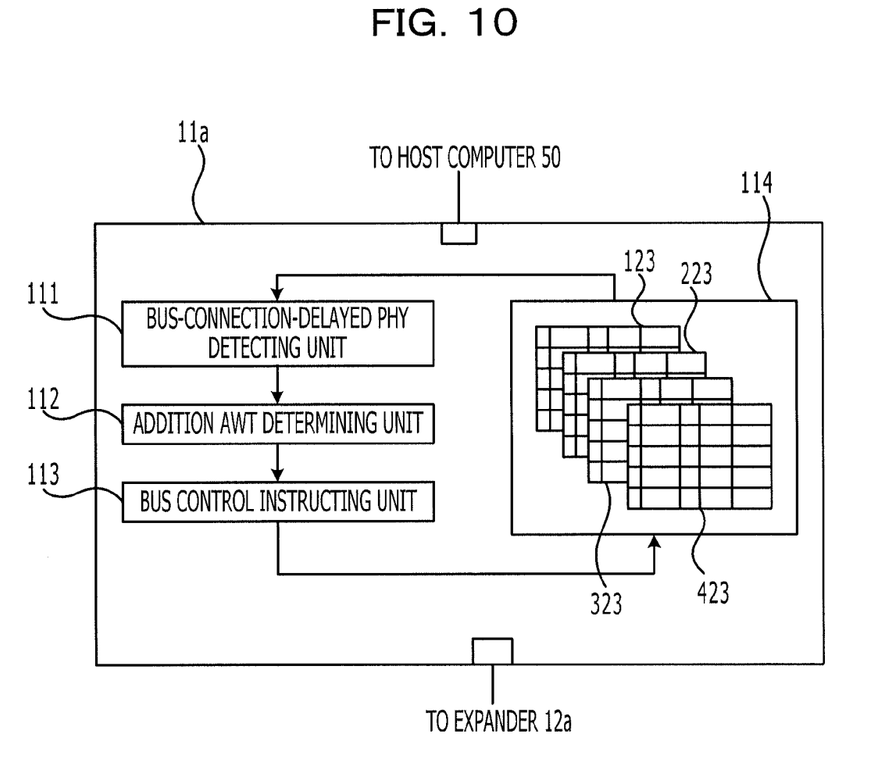
FIG. 10 is a block diagram illustrating a control module of an embodiment.

FIG. 10 is a block diagram illustrating a control module of an embodiment.

The control module 11*a* has a bus-connection-delayed Phy detecting unit 111 having similar functions to those of the bus-connection-delayed Phy detecting unit 325 and an addition AWT determining unit 112 having similar functions to the addition AWT determining unit 326.

The control module 11*a* further has a bus control instructing unit 113 which uses an addition AWT calculated by the addition AWT determining unit 112 to perform addition AWT updating processing on the expanders 12*a*, 22*a*, 32*a*, and 42*a* and an AWT management table acquiring unit 114 which acquires and stores AVVT management tables that the expanders 12*a*, 22*a*, 32*a*, and 42*a* have. FIG. 10 illustrates an AWT management table 123 that the expander 12*a* has, an AWT management table 223 that the expander 22*a* has, an AWT management table 323 that the expander 32*a* has, and an AWT management table 423 that the expander 42*a* has.

The AWT management table acquiring unit 114 uses commands provided from the expanders 12*a*, 22*a*, 32*a*, and 42*a* to acquire the AWT management tables that the expanders 12*a*, 22*a*, 32*a*, and 42*a* have.

The bus-connection-delayed Phy detecting unit 111 selects a Phy having a delay tendency or a Phy without a delay tendency but to be controlled with priority.

The addition AWT determining unit 112 may use the similar addition method to the one used by the addition AWT determining unit 326 to calculate an increased AWT.

The bus control instructing unit 113 uses the increased AWT calculated by the addition AWT determining unit 326 to perform processing of updating addition AWTs in the AWT management tables 123, 223, 323, and 423 of the expanders in accordance with the commands provided from the expanders 12*a*, 22*a*, 32*a*, and 42*a*.

The expanders 12*a*, 22*a*, 32*a*, and 42*a* perform bus connection control based on the addition AWTs.

In the storage system 100*a* illustrated in FIG. 9, in order to perform bus connection priority processing on disks 43*d*, 43*e*, and 43*f* on which backup processing is to be performed, the control module 11*a* sets the addition AWT to the addition AWT field for the expander 42*a* in the AWT management table 423, that is, under the Phy ID=7. The expander 42*a* performs bus connection adjustment processing on the basis of the set addition AWT.

The storage system according to an embodiment provides the similar effects to those of the storage system of the above-described embodiment.

The storage system of an embodiment further allows establishment of bus connections with priority to an intensively accessed device, if any, by instructing to set an addition AWT to the addition AWT field under the Phy ID for the device. For example, an addition AWT may be set only for OAFs from a Phy connected to a disk designated for intensive processing for a backup processing to increase the speed of the backup processing.

Having described above the access control apparatus, access control method and storage system of the present invention on the basis of the illustrated embodiments, the present invention is not limited thereto. The configurations of the functions may be replaced by arbitrary configurations having similar functions. Other arbitrary components and/or operations may be added to the present invention.

According to an embodiment, a method of controlling access, including selecting one of devices for connection to a target device and adjusting wait conditions of the devices by increasing a delay tendency relative to a predetermined threshold value.

The present invention may include a combination of arbitrary two or more configurations (characteristics) of the aforementioned embodiments.

The aforementioned processing functions may be implemented by a computer. In this case, a program may be provided which describes processing details of the function that the access control apparatus 1, control module 11a, and expanders 12, 22, 32, and 42 should have. By executing the program by a computer, the aforementioned processing functions may be implemented on the computer. The program describing the processing details may be recorded in a computer-readable recording medium. The computer-readable recording medium may be a magnetic storage device, an optical disk, a magneto-optical recording medium, a semiconductor memory or the like. The magnetic storage device may be a hard disk device (HDD), a flexible disk (FD), a magnetic tape or the like. The optical disk may be a DVD, a DVD-RAM, a CD-ROM/RW or the like. The magneto-optical recording medium may be an MO (Magneto-Optical disk).

In order to distribute the program, a portable recording medium such as a DVD and a CD-ROM recording the program may be sold, for example. The program may be pre-stored in a storage device in a server computer and be transferred from the server computer to another computer over a network.

A computer which executes the program may store the program recorded in a portable recording medium or the program transferred from a server computer in its storage device, for example. The computer may read a program from the storage device and perform processing based on the program. The computer may directly read a program from the portable recording medium and perform processing based on the program. Every time a program is transferred from a connected server computer over a network, the computer may sequentially perform processing based on the received program.

At least a part of the aforementioned processing functions may be implemented by an electronic circuit such as a DSP (digital signal processor), an ASIC (application specific integrated circuit), and a PLD (programmable logic device).

As mentioned above, embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention, the scope of which is defined in the claims and their equivalents.

What is claimed is:

1. An access control apparatus which establishes a connection based on connection establishment requests from a plurality of connected devices and controls accesses to a connection target device, the access control apparatus comprising:
a connection information managing means for managing connect wait conditions to the connection target device of the connected devices based on criterion information contained in a connection request transmitted from the plurality of connected devices and determination for selecting one connected device from the plurality of connected devices;
a selecting means for selecting one of the connected devices which has a delay tendency related to connection based on adjustment information which is set in accordance with the connect wait conditions of the connected devices, the delay tendency being increased in connection of the connected device; and
a determining means for determining the connected device selected as one to be connected with the connection target device.

2. The access control apparatus according to claim 1, wherein the selecting means selects said one of the connected devices which has the delay tendency related to connection based on the connect wait conditions of the connected devices and the adjustment information.

3. The access control apparatus according to claim 1, comprising:
an adjustment information generating means for generating the adjustment information based on a result by the selecting means.

4. The access control apparatus according to claim 3, wherein the adjustment information generating mean generates the adjustment information upon occurrence of the connected device having waited for connection for a predetermined or longer period of time.

5. The access control apparatus according to claim 1, wherein the criterion information has information on elapsed times from a time when the connected devices transmit bus connection requests to a time when the connected devices are connected with the connection target computer; and
the adjustment information generating means generates the adjustment information based on an average value of the elapsed times of the connected devices.

6. An access control method which establishes a connection based on a connection establishment request from a plurality of connected devices connected with an access control device and controls accesses to a connection target device, the method comprising:

managing a connect wait condition to the connection target device of each of the connected devices based on criterion information which is transmitted in response to connection requests from the plurality of connected devices and determination for selecting one connected device from the plurality of connected devices; selecting one of the connected devices which has a delay tendency related to bus connection based on adjustment information which is set in accordance with the connect wait condition of each of the connected devices, the delay tendency related to the bus connection of the connected device being increased; and determining the selected connected device as one to be connected with the connection target device.

7. A storage system comprising:

a plurality of data storage units; and an access control apparatus which establishes a connection based on connection establishment requests from the data storage units and controls accesses to a connection target device, wherein the access control includes:

a connection information managing unit which manages connect wait conditions to the connection target device of the connected devices based on criterion information which is contained in a connection request transmitted from the plurality of connected devices and determination for selecting one connected device from the plurality of connected devices;

a selecting unit which selects one of the connected devices which has a delay tendency related to connection based on adjustment information which is set in accordance with the connect wait conditions of the connected devices and increases the delay tendency related to connection of the connected device; and a determining unit which determines the connected device selected by the selecting unit as one to be connected with the connection target device.

8. An access control apparatus which establishes a connection based on connection establishment requests from a plurality of connected devices and controls accesses to a connection target device, the access control apparatus comprising:

a processor to execute a procedure, the procedure including:

managing connect wait conditions to the connection target device of the connected devices based on criterion information contained in a connection request transmitted from the plurality of connected devices and determination for selecting one connected device from the plurality of connected devices;

selecting one of the connected devices which has a delay tendency related to connection based on adjustment information which is set in accordance with the connect wait conditions of the connected devices and increasing the delay tendency related to connection of the connected device; and determining the connected device selected by the selecting unit as one to be connected with the connection target device.

9. An access control method performed by an access control apparatus, the access control apparatus controlling to establish connection between a connection target device and a plurality of connected devices based on connection requests from the plurality of connected devices, the method comprising:

receiving a connection request transmitted from the connected devices;

managing connect wait conditions to the connection target device of the connected devices based on criterion information contained in the connection request;

selecting one of the connected devices which has a delay tendency related to connection based on adjustment information which is set in accordance with the connect wait conditions of the connected devices; and determining the connected device selected by the selecting as one to be connected with the connection target device.

* * * * *